US010473682B2

(12) United States Patent
Abo et al.

(10) Patent No.: US 10,473,682 B2
(45) Date of Patent: Nov. 12, 2019

(54) FLOW METER INCLUDING INCREASED MEASURING DETECTION ACCURACY

(71) Applicant: Surpass Industry Co., Ltd., Saitama (JP)

(72) Inventors: Kazuo Abo, Saitama (JP); Koji Nakajima, Saitama (JP)

(73) Assignee: Surpass Industry Co., Ltd., Saitama (JP)

(*) Notice: Subject to any disclaimer, the term of this patent is extended or adjusted under 35 U.S.C. 154(b) by 111 days.

(21) Appl. No.: 15/782,215

(22) Filed: Oct. 12, 2017

(65) Prior Publication Data
US 2018/0106826 A1 Apr. 19, 2018

(30) Foreign Application Priority Data

Oct. 18, 2016 (JP) .................................. 2016-204264

(51) Int. Cl.
*G01P 5/10* (2006.01)
*G01F 1/684* (2006.01)
(Continued)

(52) U.S. Cl.
CPC .............. *G01P 5/10* (2013.01); *G01F 1/6847* (2013.01); *G01F 1/7084* (2013.01); *G01F 15/006* (2013.01); *G01F 15/02* (2013.01)

(58) Field of Classification Search
CPC ........ G01P 5/10; G01F 1/6847; G01F 1/7084; G01F 15/006; G01F 15/02; G01F 15/18; G01F 1/69; B32B 37/1207
See application file for complete search history.

(56) References Cited

U.S. PATENT DOCUMENTS 3,992,043 A * 11/1976 Whitley ................ F16L 19/061
285/39
6,208,254 B1 * 3/2001 McQueen ............... G01F 1/684
340/603
(Continued)

FOREIGN PATENT DOCUMENTS

EP 1365216 A1 11/2003
EP 3059557 A1 * 8/2016 ........... G01F 1/6847
(Continued)

OTHER PUBLICATIONS

Foreign Communication from a related application—Extended European Search Report of EP Application No. 17195910.9, dated Mar. 8, 2018, 8 pages.

*Primary Examiner* — Harshad R Patel
*Assistant Examiner* — Nigel H Plumb
(74) *Attorney, Agent, or Firm* — Conley Rose, P.C.; Keith C. Rawlins

(57) ABSTRACT

Provided is a flow meter that determines a liquid flow rate based on temperature. The flow meter has a cylindrical measurement tube having an internal flow passage, and a temperature detecting substrate including a heating resistance element a temperature detecting resistance element formed on a detection surface thereof. The measurement tube has a flat surface facing the detection surface of the temperature detecting substrate, and a pair of recesses arranged so as to sandwich the internal flow passage at a position where the heating resistance element is arranged. The flat surface and the detection surface are bonded together to form two bonding area. A width of the first bonding area is narrower than a width of the second bonding area so that heat, transmitted through the measurement tube from the heating resistance element is increased.

6 Claims, 7 Drawing Sheets

(51) Int. Cl.
*G01F 1/708* (2006.01)
*G01F 15/00* (2006.01)
*G01F 15/02* (2006.01)

(56) References Cited

U.S. PATENT DOCUMENTS

| | | |
|---|---|---|
| 2002/0130780 A1 | 9/2002 | McQueen et al. |
| 2003/0049877 A1* | 3/2003 | Mayer .................... G01F 1/6845 438/48 |
| 2004/0025585 A1* | 2/2004 | Seki ....................... G01F 1/6845 73/204.26 |
| 2005/0022594 A1* | 2/2005 | Padnnanabhan Aravind .............. G01F 1/684 73/204.26 |
| 2016/0245682 A1* | 8/2016 | Igarashi .................... G01F 1/69 |
| 2016/0245683 A1* | 8/2016 | Igarashi .................... G01F 15/18 |

FOREIGN PATENT DOCUMENTS

| | | |
|---|---|---|
| EP | 3059557 A1 | 8/2016 |
| JP | 2006010322 A | 1/2006 |

* cited by examiner

FLOW METER INCLUDING INCREASED MEASURING DETECTION ACCURACY

CROSS-REFERENCE TO RELATED APPLICATIONS

This application is based on Japanese Patent Application No. 2016-204264, the contents of which are incorporated herein by reference in its entirety.

TECHNICAL FIELD

The present disclosure relates to a flow meter.

BACKGROUND ART

A thermal flow meter that controls the temperature of liquid flowing through a flow passage and measures a flow rate based on a temperature difference between the liquid on an upper stream side of a temperature control portion and the liquid on a downstream side thereof has been heretofore known (e.g., see Japanese Unexamined Patent Application, Publication No. 2006-10322 (hereinafter referred to as "JP 2006-10322").

JP 2006-10322 discloses a thermal flow meter having a structure in which a glass substrate is provided with a rectangular groove and a flow passage is formed by bonding the glass substrate where the groove is formed to another glass substrate provided with a heating means and a temperature detecting means that are formed on a side of the glass substrate where the groove is formed.

SUMMARY

Technical Problem

The thermal flow meter preferably includes a tubular measurement tube with a straight tube portion extending linearly when measuring a very small amount of flow rate (e.g., 0.06 mL/min to 3 mL/min). The inclusion of the tubular measurement tube with the straight tube portion enables rectifying flow of liquid to stably send the liquid to the temperature detecting means.

When the flow rate of liquid is measured by bonding the substrate on which the heating means and the temperature detecting means are formed to the tubular measurement tube, heat from the heating means is transmitted to the liquid circulated in the measurement tube through the measurement tube.

However, if the area where the heating means and the measurement tube are bonded together is large, a part of the heat from the heating means is transmitted to the measurement tube itself, or to the outside of the measurement tube, without being transmitted to the liquid.

The present disclosure has been made in view of the above-mentioned circumstances, and an object of the present disclosure is to increase the quantity of heat transmitted from a heating resistance element to liquid circulated in a cylindrical measurement tube in a flow meter having a structure in which a temperature detecting substrate having the heating resistance element and a temperature detecting resistance element formed on a detection surface thereof is bonded to the measurement tube.

Solution to Problem

In order to solve the foregoing problem, the following solutions have been adopted in the present disclosure.

A flow meter according to an aspect of the present disclosure includes a cylindrical measurement tube including an inlet through which liquid enters and an outlet through which the liquid flowing from the inlet exits, and having an internal flow passage extending along an axis; and a temperature detecting substrate having a heating resistance element and a temperature detecting resistance element formed on a detection surface thereof along the axis. An outer circumferential surface of the measurement tube is provided with a flat surface arranged as opposed to the detection surface of the temperature surface, and a pair of recesses arranged so as to sandwich the internal flow passage at a position where the heating resistance element is arranged on the axis. The flat surface and the detection surface are bonded together to form a planar bonding area having a width in a direction orthogonal to the axis. The width of a first portion on the axis where the pair of recesses is arranged is narrower than the width of a second portion on the axis where the pair of recesses is not arranged.

According to a flow meter in an aspect of the present disclosure, the flat surface formed on the outer circumferential surface of the cylindrical measurement tube and the detection surface of the temperature detecting substrate on which the heating resistance element and the temperature detecting resistance element are formed are bonded together to form a planar bonding area having a width in the direction orthogonal to the axis. On the outer circumferential surface of the measurement tube, the pair of recesses is formed so as to sandwich the internal flow passage at a position where the heating resistance element is arranged on the axis. Further, the width of the bonding area in a first portion on the axis where the pair of recesses is arranged is narrower than the width of the bonding area in a second portion on the axis where the pair of recesses is not arranged.

With the structure described above, in the first portion on the axis where the pair of recesses is arranged on the axis, the width of the bonding area is narrowed by the pair of recesses, and the quantity of heat transmitted to the liquid through the measurement tube from the heating resistance element is increased as compared with a case where the pair of recesses is not provided. In the second portion on the axis where the pair of recesses is not arranged, the width of the bonding area is secured, so that the temperature detecting substrate and the measurement tube can be securely bonded and fixed.

Accordingly, in the flow meter having a structure in which the temperature detecting substrate having the heating resistance element and the temperature detecting resistance element that formed on the detection surface thereof is bonded to the cylindrical measurement tube, the quantity of heat transmitted from the heating resistance element to the liquid circulated in the measurement tube can be increased.

According to a flow meter in an aspect of the present disclosure, an inner diameter of the internal flow passage may be equal to or less than 1.5 times a width of the heating resistance element in a cross section orthogonal to the axis.

When the inner diameter of the internal flow passage is equal to or less than 1.5 times the width of the heating resistance element in the cross section orthogonal to the axis, the inner diameter of the internal flow passage is relatively small, and thus a part of the heat from the heating resistance element is not transmitted to the liquid, and the liquid is likely to be transmitted to the measurement tube itself, or to the outside of the measurement tube. In this aspect, even when a part of the heat from the heating resistance element is less likely to be transmitted to the liquid, the formation of the pair of recesses on the outer circumferential surface of the measurement tube makes it possible to increase the quantity of heat transmitted from the heating resistance element to the liquid circulated in the measurement tube.

According to a flow meter in an aspect of the present disclosure, the pair of recesses may be formed of a pair of planes arranged in parallel with each other so as to sandwich the internal flow passage, and an angle formed between the flat surface and each of the pair of planes may be a right angle.

With the structure described above, the pair of recesses is formed of the pair of planes which is arranged in parallel with each other so as to sandwich the internal flow passage and which forms a right angle with the flat surface, so that the quantity of heat transmitted from the heating resistance element to the liquid circulated in the measurement tube can be increased.

According to a flow meter in an aspect of the present disclosure, the heating resistance element may be arranged at a position on a downstream side in a circulation direction of the liquid from a midpoint of a line leading from the inlet to the outlet.

With the structure described above, the heating resistance element and the temperature detecting resistance element are arranged at positions on the downstream side from the midpoint of the line leading from the inlet to the outlet, and the liquid which has passed through a position corresponding to a midpoint of the length of the flow passage of the internal flow passage and whose circulation state is stabilized is heated and the temperature of the heated liquid can be detected. Accordingly, measuring errors in the flow rate of the liquid can be suppressed as compared with a case where the liquid whose circulation state is not stabilized is heated and the temperature of the heated liquid is detected.

In the flow meter having the structure described above, the heating resistance element may be arranged at a position of a midpoint of a line leading from an end portion of the first portion facing the inlet to an end portion of the first portion facing the outlet.

With the structure described above, the end portion of the first portion which faces the inlet and in which the pair of recesses is arranged and the end portion of the first portion facing the outlet are provided at equal distances from the heating resistance element, so that the quantity of heat transmitted from the heating resistance element to the measurement tube on the upstream side of the heating resistance element can be made equal to the quantity of heat transmitted from the heating resistance element to the measurement tube on the downstream side of the heating resistance element.

In a flow meter in accordance with an aspect of the present disclosure, the temperature detecting substrate and the measurement tube may be made of glass.

Using the temperature detecting substrate and the measurement tube which have excellent heat resistance and less probability of deformation by heat, the flow rate measurement accuracy can be maintained regardless of changes in temperature. In addition, because the materials with the same thermal conductivity properties are bonded together, the adhesiveness of the temperature detecting substrate to the measurement tube can be maintained regardless of changes in temperature.

Advantageous Effects

According to the present disclosure, in a flow meter having a structure in which a temperature detecting substrate having a heating resistance element and a temperature detecting resistance element formed on a detection surface thereof is bonded to an outer circumferential surface of a cylindrical measurement tube, the quantity of heat transmitted from the heating resistance element to liquid circulated in the measurement tube can be increased.

DESCRIPTION OF EMBODIMENTS

A flow meter 100 according to an embodiment of the present disclosure will be described below with reference to the drawings.

The flow meter 100 of the embodiment is a time-of-flight type flow meter that heats liquid circulated in an internal flow passage and measures the flow rate of the liquid based on a time required for heated liquid to travel. The flow meter 100 of the embodiment is suitable for, for example, measuring a very small amount of flow rate of 0.06 mL/min to 3 mL/min.

Figure 1:
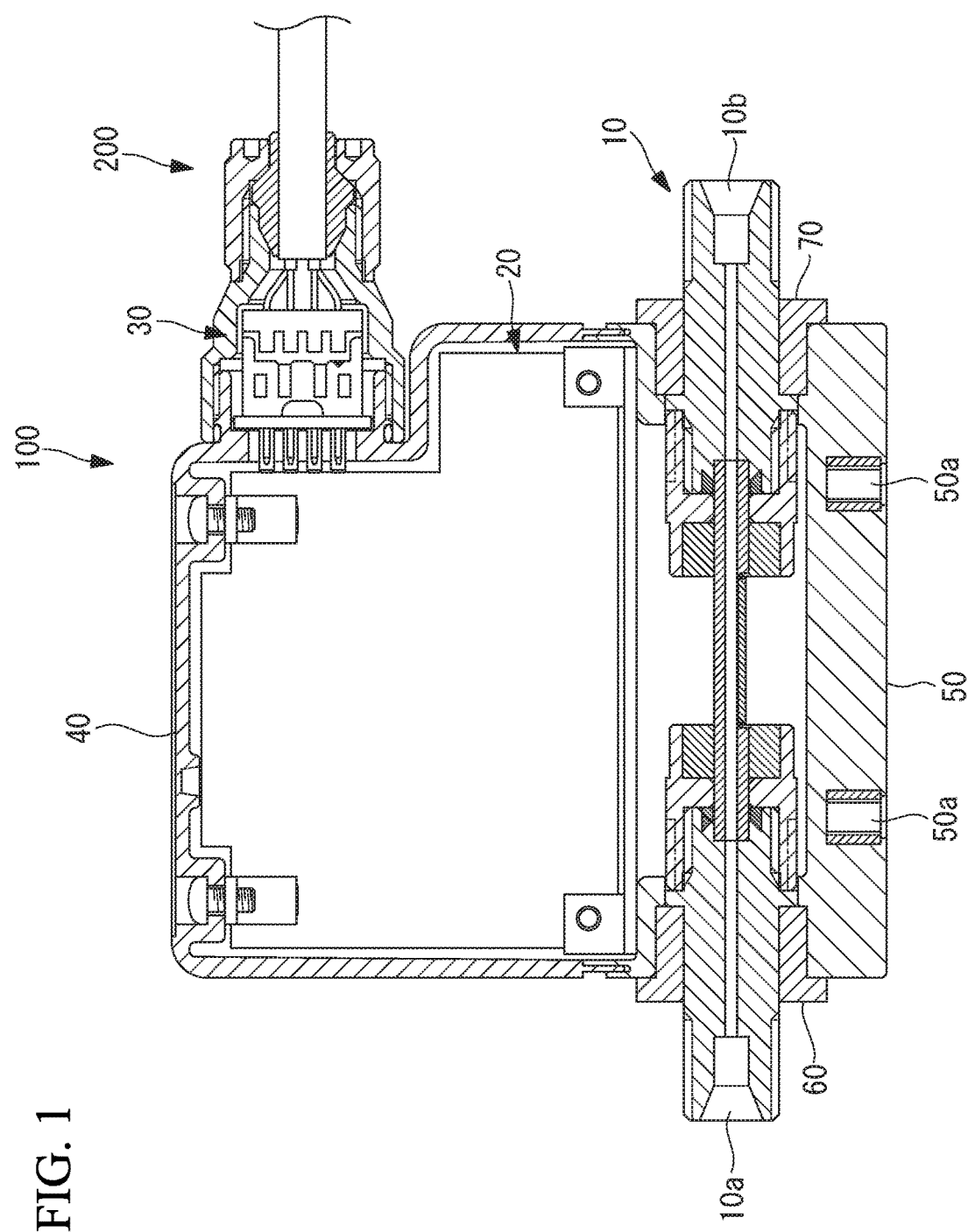
FIG. 1 is a longitudinal sectional view of a flow meter according to an embodiment of the present disclosure.
Figure 2:
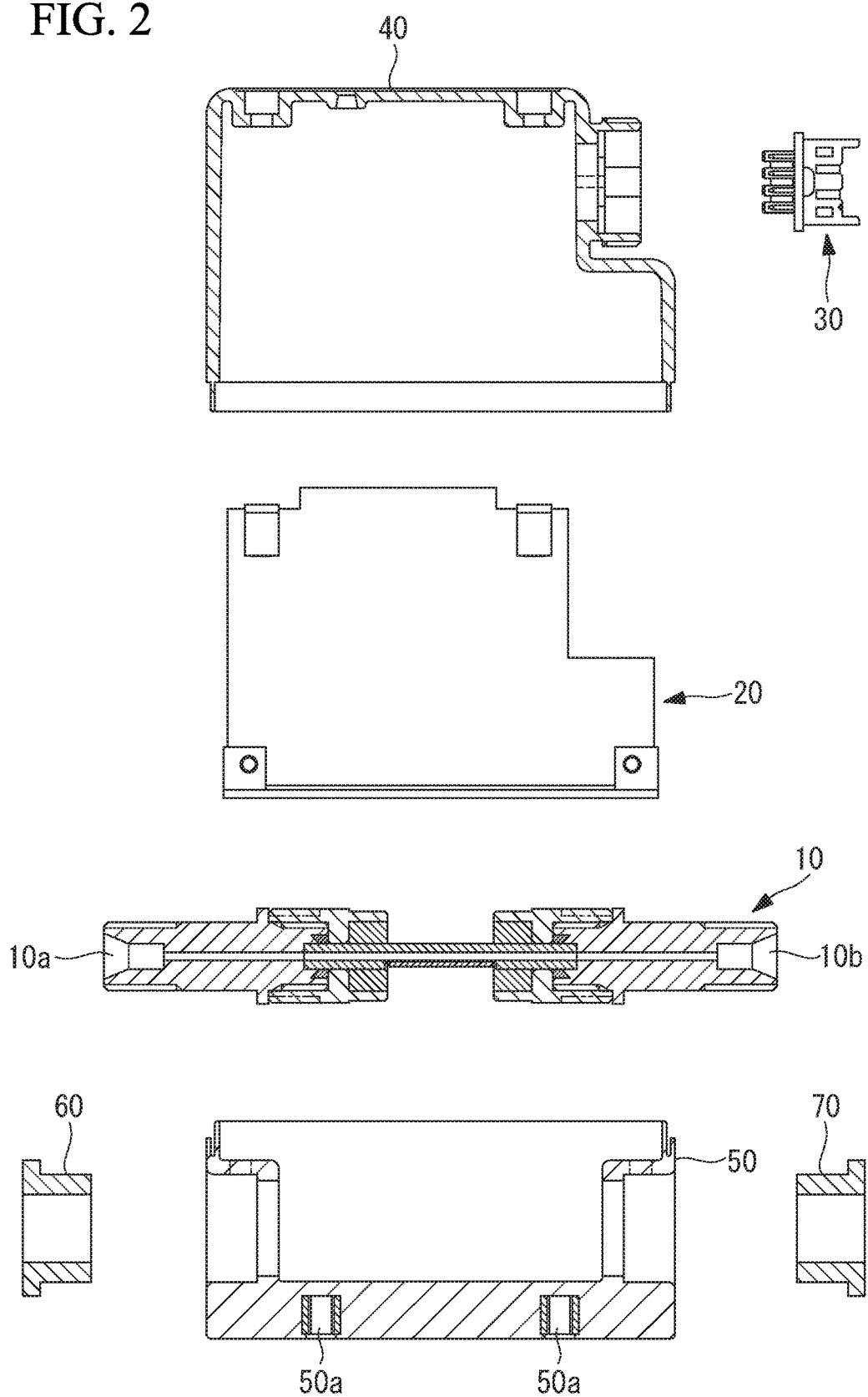
FIG. 2 is an exploded view of the flow meter shown in FIG. 1.

As shown in FIGS. 1 and 2, the flow meter 100 of the embodiment includes a sensor portion 10, a control substrate 20, a relay substrate 30, an upper case 40, and a bottom case 50.

Figure 3:
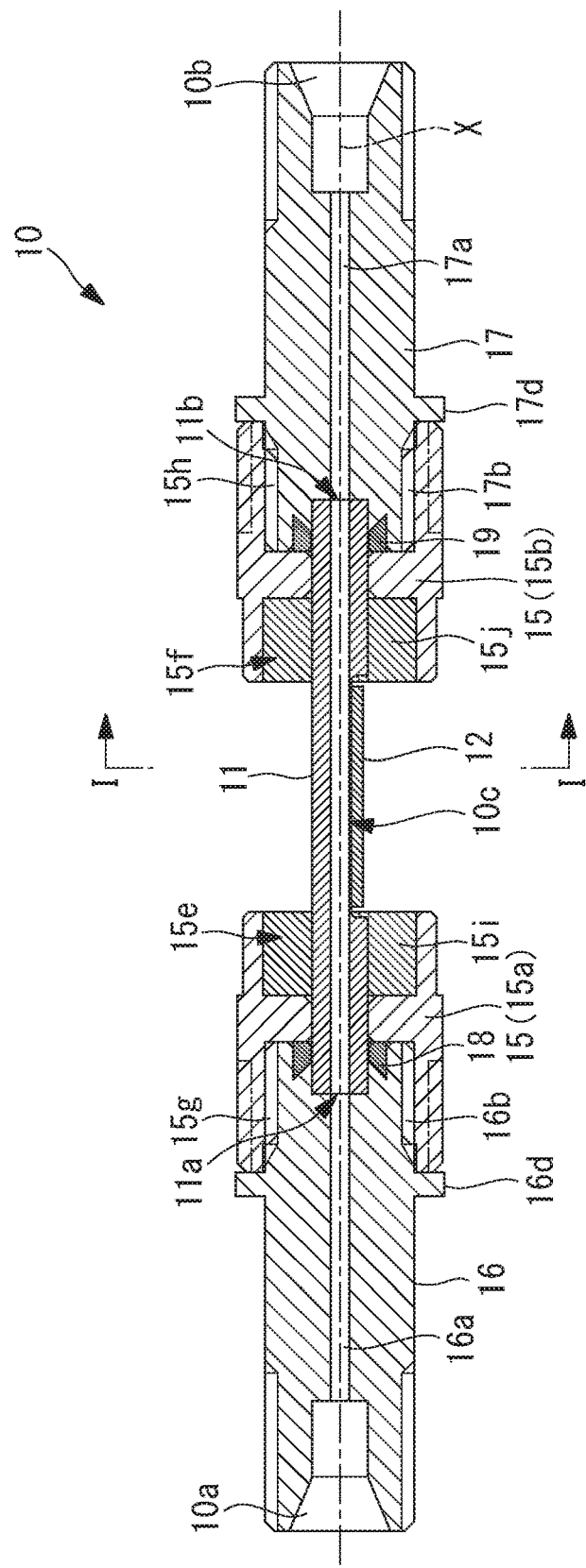
FIG. 3 is a longitudinal sectional view of a sensor portion shown in FIG. 2.

As shown in FIG. 3, the sensor portion 10 measures the flow rate of liquid that enters from an inlet 10a, which is connected to an external pipe (not shown), exits from an outlet 10b, which is connected to an external pipe (not shown), and is circulated in an internal flow passage 10c.

The sensor portion 10 detects the temperature of the liquid heated by a heating resistance wire 12a (heating resistance element) shown in FIG. 9, which is described below, by using temperature detecting resistance wires 12b and 12c (temperature detecting resistance element) shown in FIG. 9, and transmits a temperature detecting signal indicating the detected temperature to the control substrate 20 through a signal line (not shown). Further, the sensor portion 10 detects the temperature of the liquid heated by the heating resistance wire 12a by using temperature correcting resistance wires 12e and 12f shown in FIG. 9, and transmits a temperature correcting signal indicating the detected temperature to the control substrate 20 through a signal line (not shown).

The sensor portion 10 will be described in detail below.

The control substrate 20 transmits a voltage signal to the heating resistance wire 12a of the sensor portion 10 and heats the heating resistance wire 12a. Further, the control substrate 20 is a device that calculates the flow rate of the liquid based on the temperature detecting signals transmitted from the temperature detecting resistance wires 12b and 12c and the temperature correcting signals transmitted from the temperature correcting resistance wires 12e and 12f.

The relay substrate 30 is a substrate that performs a relay for transmitting and receiving various signals between the control substrate 20 and an external device (not shown). The relay substrate 30 is connected with a cable 200 for transmitting various signals to the external device (not shown) and receiving various signals from the external device.

The upper case 40 is a member serving as an upper housing of the flow meter 100, and houses the control substrate 20 therein.

The bottom case 50 is a member serving as a lower housing of the flow meter 100, and houses the sensor portion 10 therein. A stopper 60 is inserted between the bottom case 50 and the sensor portion 10 from a side of the sensor portion 10 that is closer to the inlet 10a in a state where the sensor portion 10 is inserted in the bottom case 50. Similarly, a stopper 70 is inserted between the bottom case 50 and the sensor portion 10 from a side of the sensor portion 10 that is closer to the outlet 10b in the state where the sensor portion 10 is inserted in the bottom case 50. The sensor portion 10 is fixed to the bottom case 50 by the stoppers 60 and 70.

A fastening hole 50a and a fastening hole 50b are formed in the bottom surface of the bottom case 50, and the bottom case is fixed to an installation surface (not shown) with fastening bolts (not shown) that are inserted from below the installation surface.

Next, the sensor portion 10 will be described in detail.

Figure 4:
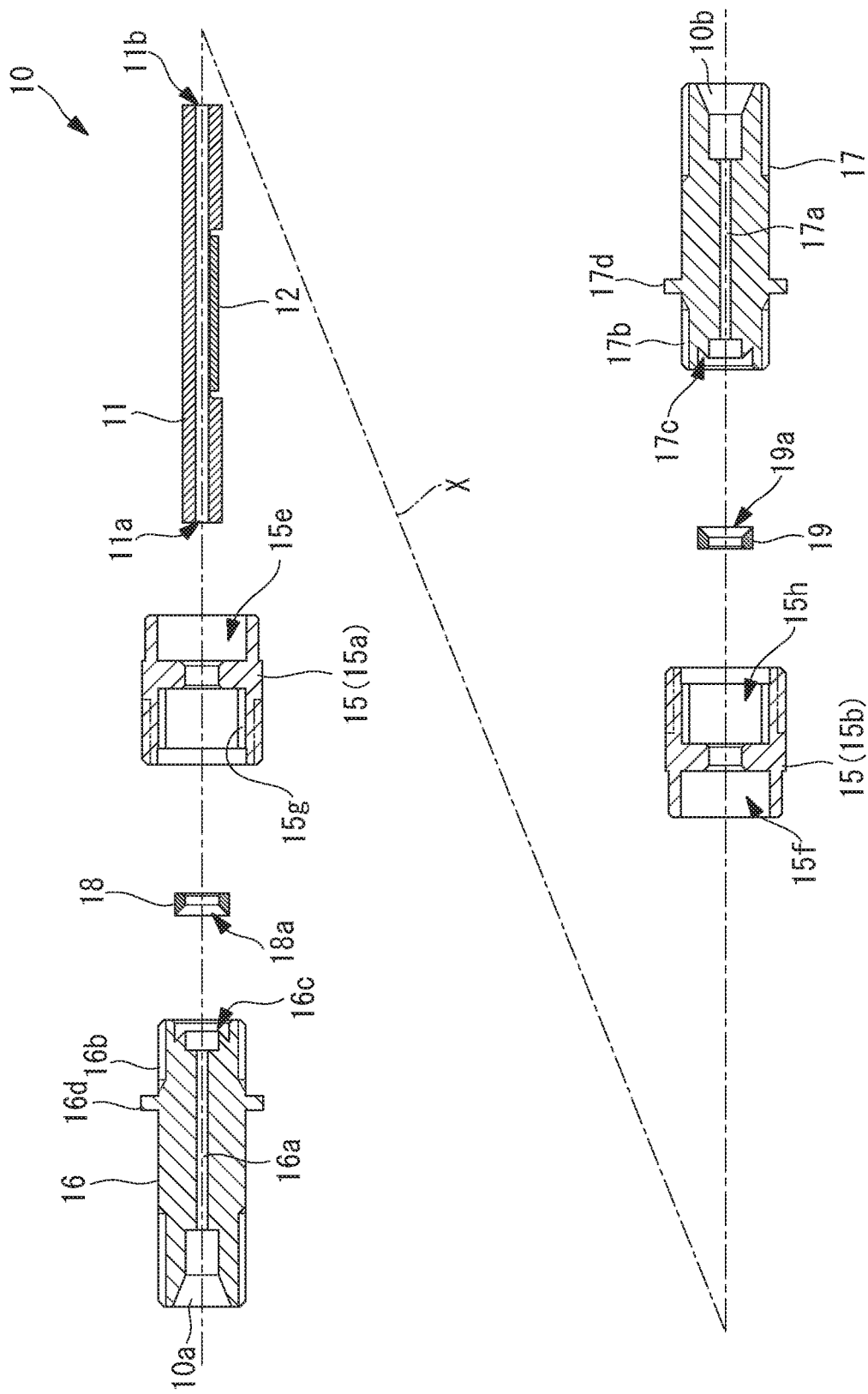
FIG. 4 is an exploded view of the sensor portion shown in FIG. 3.

As shown in FIGS. 3 and 4, the sensor portion 10 includes a measurement tube 11, a sensor substrate (temperature detecting substrate) 12, nuts 15, an inlet-side body 16, an outlet-side body 17, an inlet-side ferrule 18, and an outlet-side ferrule 19.

Figure 6:
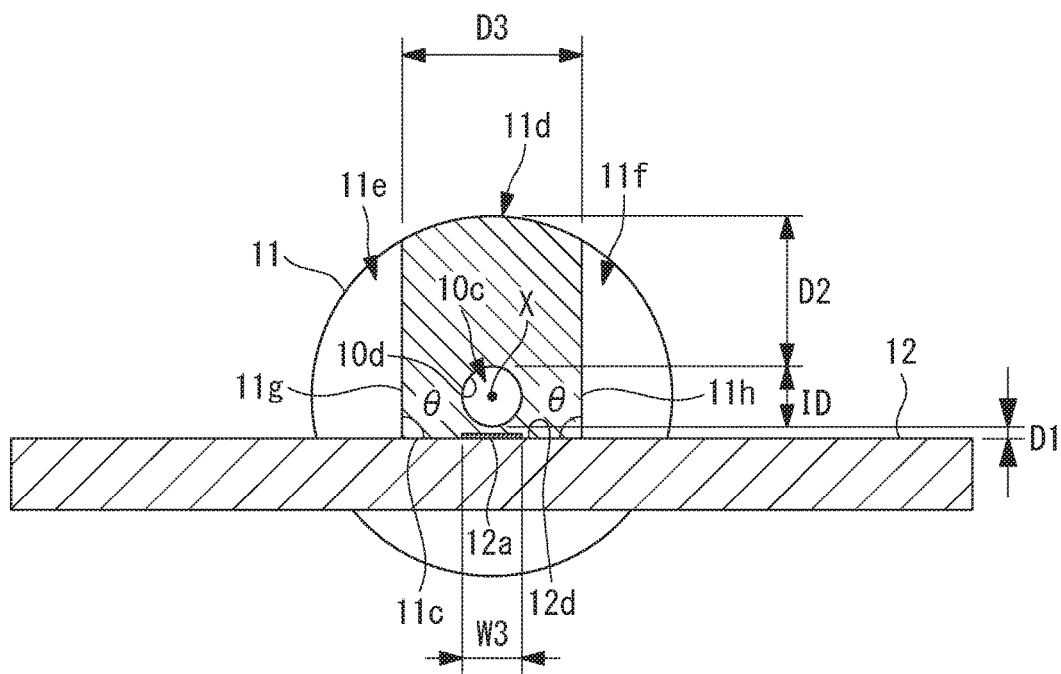
FIG. 6 is a cross-sectional view of the sensor portion taken along the line I-I shown in FIG. 3.

The measurement tube 11 is a tube having an inlet 11a through which liquid enters and an outlet 11b through which liquid flowing from the inlet 11a exits. As shown in FIG. 6 (a cross-sectional view taken along the line I-I in FIG. 3), the measurement tube 11 is provided with the internal flow passage 10c having a circular cross section and extending along an axis X. The measurement tube 11 is formed of glass (e.g., quartz glass in which the content of silicon dioxide is 100%, or other glass containing components other than silicon dioxide).

Figure 8:
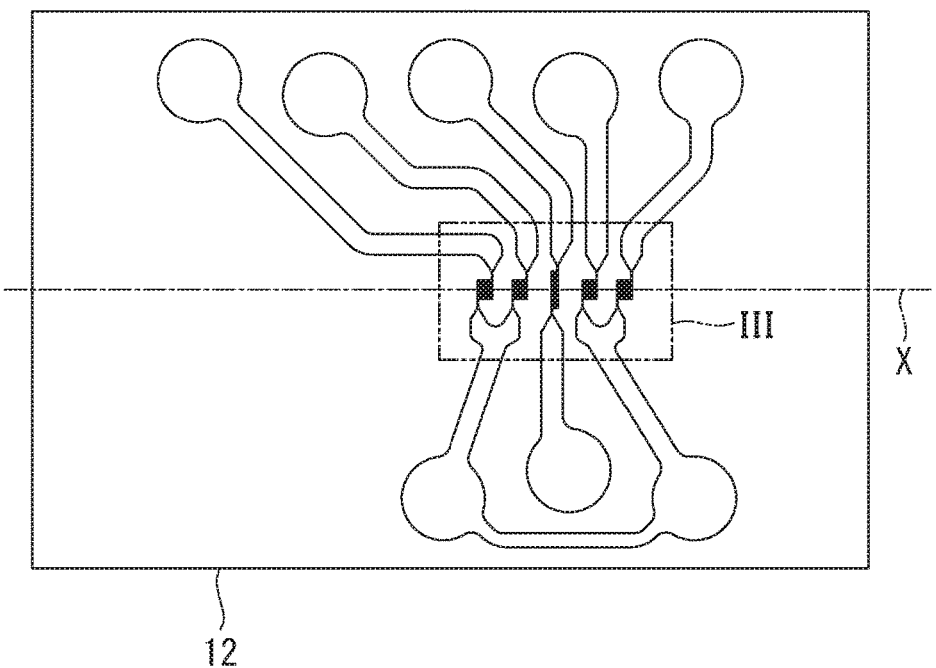
FIG. 8 is a plan view of the sensor substrate shown in FIG. 5A as viewed from a detection surface.
Figure 9:
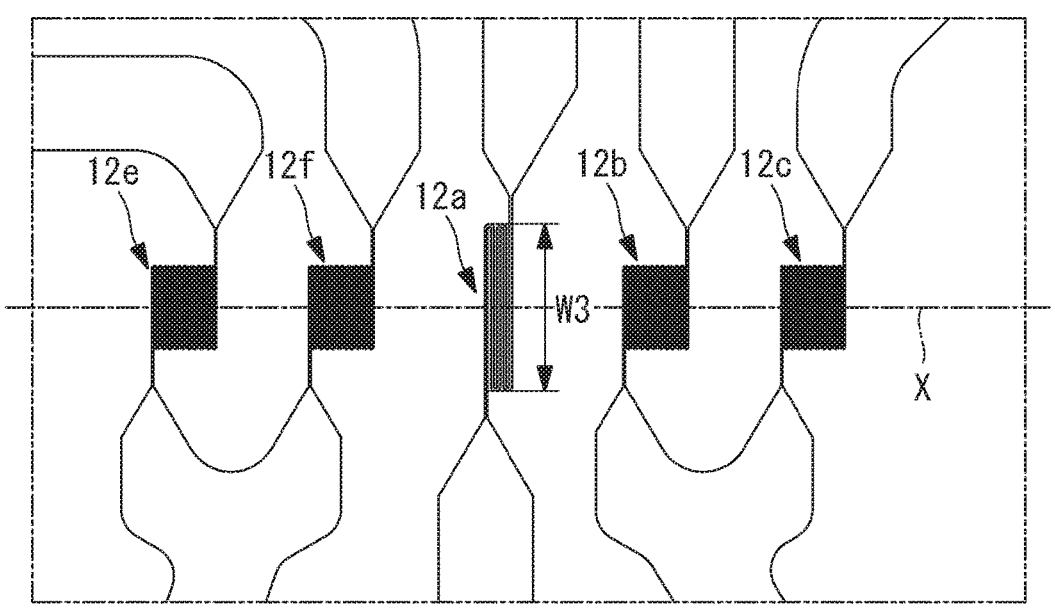
FIG. 9 is a partial enlarged view of a portion III of the sensor substrate shown in FIG. 8.

As shown in FIGS. 8 and 9 (partially enlarged views of a portion III shown in FIG. 8), the sensor substrate 12 is a substrate formed of glass (e.g., quartz glass in which the content of silicon dioxide is 100%, or other glass containing components other than silicon dioxide) obtained by forming the temperature correcting resistance wire 12e, the temperature correcting resistance wire 12f, the heating resistance wire (heating resistance element) 12a, the temperature detecting resistance wire (temperature detecting resistance element) 12b, and the temperature detecting resistance wire (temperature detecting resistance element) 12c on a detection surface 12d (shown in FIG. 5B) along the axis X.

The temperature correcting resistance wire 12e, the temperature correcting resistance wire 12f, the heating resistance wire 12a, the temperature detecting resistance wire 12b, and the temperature detecting resistance wire 12c are each formed by depositing a metal film, such as platinum, on a substrate made of glass. Each resistance wire is linearly formed with a constant width, and extends in the direction orthogonal to the axis X. Each resistance wire is turned back at an end portion thereof in the direction orthogonal to the axis X.

The liquid circulated in the measurement tube 11 flows along the axis X from left to right in FIGS. 8 and 9. Accordingly, when the heating resistance wire 12a is instantaneously heated, the heated liquid flows from left to right along the axis X, reaches the position of the temperature detecting resistance wire 12b, and then reaches the position of the temperature detecting resistance wire 12c.

Thus, the control substrate 20 can calculate the circulation speed of the liquid circulated in the measurement tube 11 based on a timing when the heating resistance wire 12a is instantaneously heated and a timing when the temperature detecting resistance wire 12b and the temperature detecting resistance wire 12c thereafter detect the temperature of the heated liquid. Further, the control substrate 20 can calculate the flow rate of the liquid based on the calculated circulation speed and the cross sectional area of the measurement tube 11.

Note that the control substrate 20 corrects the temperature detecting signal output from the temperature detecting resistance wire 12b by using the temperature correcting signal output from the temperature correcting resistance wire 12f. A part of the heat from the heating resistance wire 12a is transmitted to the liquid through the measurement tube 11, and the other part of the heat is directly transmitted to the temperature detecting resistance wire 12b from the measurement tube 11. The quantity of heat directly transmitted from the measurement tube 11 to the temperature detecting resistance wire 12b is larger than the quantity of heat indirectly transmitted from the measurement tube 11 to the temperature detecting resistance wire 12b through the liquid.

Accordingly, the control substrate 20 uses the temperature correcting signal output from the temperature correcting resistance wire 12f to correct the quantity of heat directly transmitted from the measurement tube 11 to the temperature detecting resistance wire 12b. The distance from the temperature correcting resistance wire 12f to the heating resistance wire 12a in the direction of the axis X is equal to the distance from the temperature detecting resistance wire 12b to the heating resistance wire 12a in the direction of the axis X. Accordingly, the control substrate 20 subtracts the temperature correcting signal detected by the temperature correcting resistance wire 12f from the temperature detecting signal detected by the temperature detecting resistance wire 12b, thereby obtaining the quantity of heat indirectly transmitted from the measurement tube 11 to the temperature detecting resistance wire 12b through the liquid.

In the embodiment described above, the control substrate 20 corrects the temperature detecting signal output from the temperature detecting resistance wire 12b by using the temperature correcting signal output from the temperature correcting resistance wire 12f. Similarly, the control substrate 20 corrects the temperature detecting signal output from the temperature detecting resistance wire 12c by using the temperature correcting signal output from the temperature correcting resistance wire 12e. The distance from the temperature correcting resistance wire 12e to the heating resistance wire 12a in the direction of the axis X is equal to the distance from the temperature detecting resistance wire 12c to the heating resistance wire 12a in the direction of the axis X. Accordingly, the control substrate 20 subtracts the temperature correcting signal detected by the temperature correcting resistance wire 12e from the temperature detecting signal detected by the temperature detecting resistance wire 12c, thereby obtaining the quantity of heat indirectly transmitted from the measurement tube 11 to the temperature detecting resistance wire 12c through the liquid.

Figure 5A:
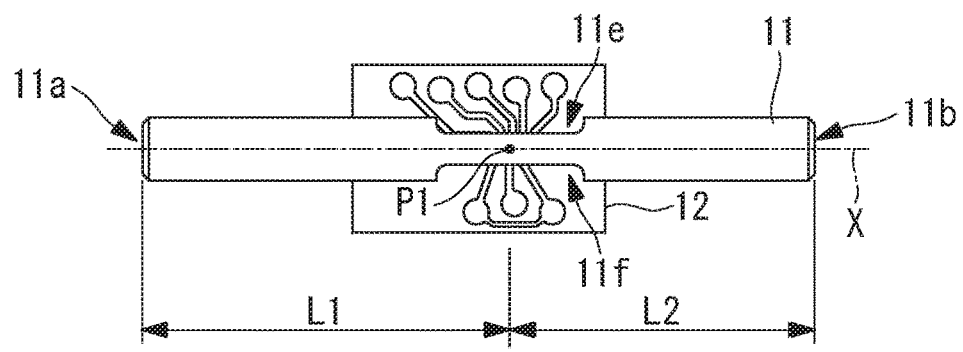
FIG. 5A is a plan view showing a measurement tube and a sensor substrate shown in FIG. 3.
Figure 5B:
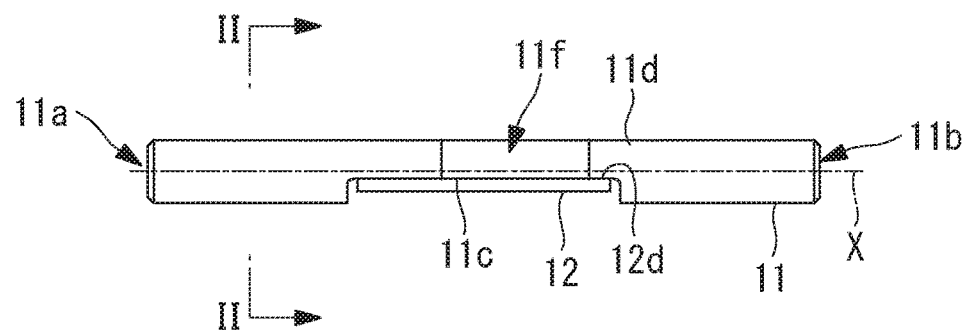
FIG. 5B is a front view showing the measurement tube and the sensor substrate shown in FIG. 3.

As shown in FIG. 5B and FIG. 6 (a cross-sectional view taken along the line I-I in FIG. 3), the outer circumferential surface of the measurement tube 11 is provided with a flat surface 11c on which the detection surface 12d of the sensor substrate 12 is oppositely arranged. As shown in FIGS. 5A and 6, the outer circumferential surface of the measurement tube 11 is provided with a first recess 11e and a second recess 11f which are arranged so as to sandwich the internal flow passage 10c at a position P1 where the heating resistance wire 12a is arranged on the axis X. The first recess 11e and the second recess 11f are provided so as to increase the quantity of heat transmitted from the heating resistance wire 12a to the liquid through the measurement tube 11.

Figure 7:
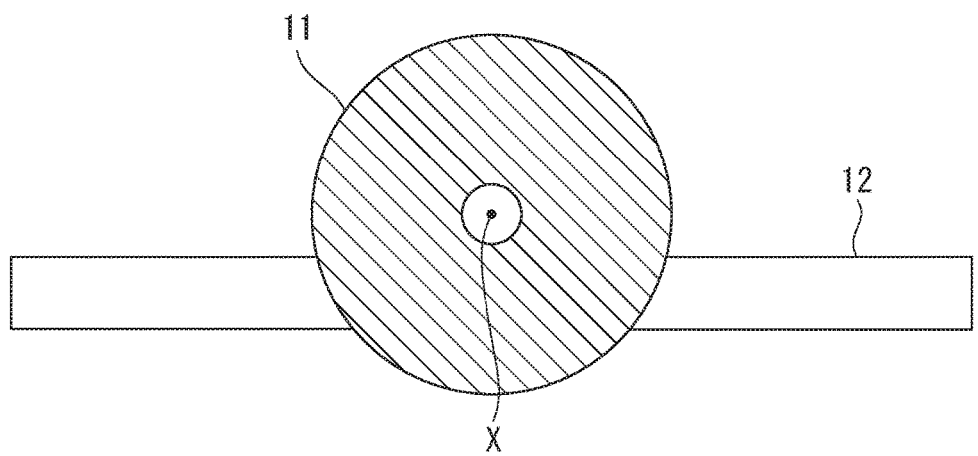
FIG. 7 is a cross-sectional view of the measurement tube and the sensor substrate taken along the line II-II shown in FIG. 5B.

Further, as shown in FIG. 7 (a cross-sectional view taken along the line II-II in FIG. 5B), the outer circumferential surface of the measurement tube 11 has a circular cross section in a plane orthogonal to the axis X at a position where the sensor substrate 12 is not bonded.

As shown in FIGS. 5B and 6, the flat surface 11c of the measurement tube 11 is arranged as opposed to the detection surface 12d of the sensor substrate 12. The flat surface 11c and the detection surface 12d are bonded together with an adhesive.

As the adhesive used herein, for example, epoxy resin-based adhesive, UV curable resin-based adhesive, thermosetting resin-based adhesive (thermosetting adhesive), and low-melting glass can be used.

Figure 5C:
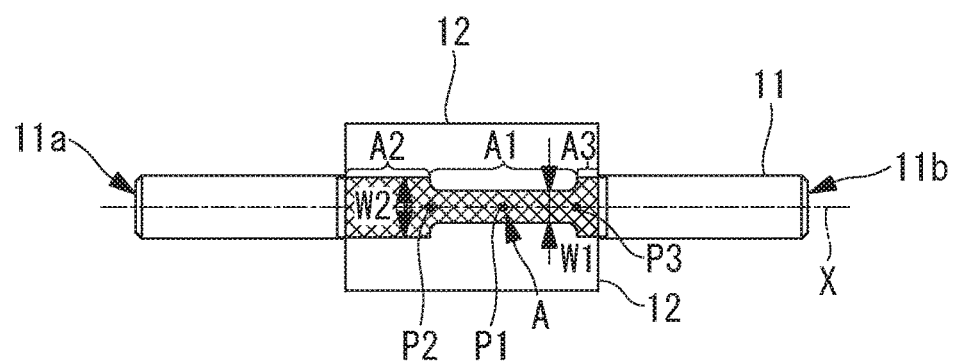
FIG. 5C is a bottom view showing the measurement tube and the sensor substrate shown in FIG. 3.

A bonding area A shown in FIG. 5C indicates an area where the flat surface 11c and the detection surface 12d are bonded together. The bonding area A is a planar area having a width in the direction orthogonal to the axis X.

As shown in FIG. 5C, the bonding area A includes a first bonding area A1 corresponding to a portion (first portion) on the axis X where the first recess 11e and the second recess 11f are arranged, and a second bonding area A2 and a third bonding area A3 which correspond to a portion (second portion) on the axis X where the first recess 11e and the second recess 11f are not arranged.

As shown in FIG. 5C, a width W1 of the first bonding area A1 is narrower than a width W2 of the second bonding area A2 and the third bonding area A3.

As shown in FIG. 6, a distance D1 (first distance) from the detection surface 12d of the sensor substrate 12 to an inner circumferential surface 10d of the internal flow passage 10c is shorter than a distance D2 (second distance) from a top portion 11d of the measurement tube 11 to the inner circumferential surface 10d of the internal flow passage 10c. This is intended to reduce the distance D1 from the detection surface 12d of the sensor substrate 12 to the inner circumferential surface 10d of the internal flow passage 10c so as to improve the conductivity of heat form the heating resistance wire 12a to the liquid and improve the temperature detection characteristics of the temperature detecting resistance wires 12b and 12c and the temperature correcting resistance wires 12e and 12f.

As shown in FIGS. 6 and 9, an inner diameter ID of the internal flow passage 10c matches a width W3 of the heating resistance wire 12a in a cross section orthogonal to the axis X. Note that the inner diameter ID of the internal flow passage 10c may be any diameter that is equal to or less than 1.5 times the width W3 of the heating resistance wire 12a in the cross section orthogonal to the axis X. However, the inner diameter ID of the internal flow passage 10c is preferably, for example, equal to or greater than 0.5 mm, to allow the fluid having a flow rate of 0.06 mL/min to 3 mL/min to be circulated.

When the inner diameter ID of the internal flow passage 10c is equal to or less than 1.5 times the width W3 of the heating resistance wire 12a, the inner diameter ID of the internal flow passage 10c is relatively small, and thus a part of the heat from the heating resistance wire 12a is not transmitted to the liquid, and the liquid is likely to be transmitted to the measurement tube 11 itself, or to the outside of the measurement tube 11. In the embodiment, even when a part of the heat from the heating resistance wire 12a is less likely to be transmitted to the liquid, the formation of the first recess 11e and the second recess 11f on the outer circumferential surface of the measurement tube 11 makes it possible to increase the quantity of heat transmitted from the heating resistance wire 12a to the liquid circulated in the measurement tube 11.

As shown in FIG. 6, the first recess 11e and the second recess 11f are formed of a first plane 11g and a second plane 11h, respectively, which are arranged so as to sandwich the internal flow passage 10c. An angle θ formed by the first plane 11g and the flat surface 11c and an angle θ formed by the second plane 11h and the flat surface 11c are each a right angle.

With the structure described above, the pair of recesses 11e and 11f is formed of the first plane 11g and the second plane 11h, respectively, which are arranged in parallel with each other so as to sandwich the internal flow passage 10c and which form a right angle with the flat surface 11c, so that the quantity of heat transmitted from the heating resistance wire 12a to the liquid circulated in the measurement tube 11 can be increased.

In this case, a distance D3 from the first plane 11g to the second plane 11h matches the width W1 of the first bonding area A1. The distance D3 is preferably equal to or less than 3 times the width W3 of the heating resistance wire 12a. With the structure described above, the first recess 11e and the second recess 11f are sufficiently large, and the quantity of heat transmitted from the heating resistance wire 12a to the liquid through the measurement tube 11 can be increased.

Further, the distance D3 from the first plane 11g to the second plane 11h is preferably equal to or less than twice the inner diameter ID of the internal flow passage 10c. With the structure described above, the measurement tube 11 around the internal flow passage 10c can obtain a sufficiently large strength.

Note that in FIG. 6, the angle θ formed between the first plane 11g and the flat surface 11c, and the angle θ formed between the second plane 11h and the flat surface 11c are each a right angle. However, the present disclosure may include another aspect.

For example, the angle θ formed between the first plane 11g and the flat surface 11c, and the angle θ formed between the second plane 11h and the flat surface 11c may be set to any angle that is larger than 30 degrees and smaller than 150 degrees.

As the angle θ is decreased, the area of the first recess 11e and the second recess 11f increases. Accordingly, the quantity of heat transmitted from the heating resistance wire 12a to the measurement tube 11 itself, or to the outside of the measurement tube 11 can be reduced. However, if the angle θ is extremely reduced, the strength of the measurement tube 11 is decreased. Accordingly, it is preferable to set the angle θ so that the distance from the internal flow passage 10c to the outer circumferential surface of the measurement tube 11 to a desired distance or longer.

When the angle θ is increased, the area of the first recess 11e and the second recess 11f is narrowed, but the width W1 of the first bonding area A1 is constant. Accordingly, the quantity of heat transmitted from the heating resistance wire 12a to the liquid through the measurement tube 11 can be increased as compared with a case where the first recess 11e and the second recess 11f are not provided.

As shown in FIG. 5A, the distance L1 from the inlet 11a of the measurement tube 11 to the position P1 where the heating resistance wire 12a is arranged on the axis X is longer than the distance L2 from the outlet 11b of the measurement tube 11 to the position P1. In other words, the heating resistance wire 12a is arranged at the position P1 on the downstream side in the liquid circulation direction from a midpoint of a line leading from the inlet 11a to the outlet 11b.

This is intended to secure the long distance L1 from the connecting position between a connecting flow passage 16a and the inlet 11a of the measurement tube 11 to the heating resistance wire 12a. By securing the long distance L1, the flow of the liquid can be stabilized until the liquid reaches the heating resistance wire 12a even when turbulence occurs in the flow of the liquid in the connecting flow passage 16a and the inlet 11a of the measurement tube 11.

As shown in FIG. 5C, the position P1 where the heating resistance wire 12a is arranged is located at a midpoint of a line leading from an end portion P2, which faces the inlet 11a, of the portion (first portion) on the axis X where the first recess 11e and the second recess 11f are arranged to an end portion P3 facing the outlet 11b.

With the structure described above, the end portion P2 and the end portion P3 are provided at equal distances from the heating resistance wire 12a, so that the quantity of heat transmitted from the heating resistance wire 12a to the measurement tube 11 on the upstream side of the heating resistance wire 12a can be made equal to the quantity of heat transmitted from the heating resistance wire 12a to the measurement tube 11 on the downstream side of the heating resistance wire 12a.

The nuts 15 include the inlet-side nut 15a attached to the inlet-side body 16 and the outlet-side nut 15b attached to the outlet-side body 17.

As shown in FIG. 3, the inlet-side nut 15a is a cylindrical member fitted along the outer circumferential surface of the measurement tube 11 to be closer to the outlet 11b than the inlet-side body 16. The inlet-side nut 15a has internal threads 15g on an inner circumferential surface of its end portion facing the inlet 10a. Also, the outlet-side nut 15b is a cylindrical member fitted along the outer circumferential surface of the measurement tube 11 to be closer to the inlet 11a than the outlet-side body 17. The outlet-side nut 15b has internal threads 15h on an inner circumferential surface of its end portion facing the outlet 10b.

The inlet-side nut 15a is attached to the inlet-side body 16 as the internal threads 15g of the inlet-side nut 15a and the external threads 16b of the inlet-side body 16 are fastened together. Similarly, the outlet-side nut 15b is attached to the outlet-side body 17 as the internal threads 15h of the outlet-side nut 15b and the external threads 17b of the outlet-side body 17 are fastened together.

The inlet-side nut 15a has the recess 15e (the first recess) that is recessed toward the inlet 10a, at its end portion facing the outlet 10b. As shown in FIG. 3, an inlet 11a side end portion of the sensor substrate 12 and an inlet 11a side end portion of the reinforcing plate 13 are inserted in the recess 15e. Also, the recess 15e is filled with the filler 15i. The inlet 11a side end portion of the sensor substrate 12 and the inlet 11a side end portion of the reinforcing plate 13 are fixed to the inlet-side nut 15a by the filler 15i.

The outlet-side nut 15b has the recess 15f (the second recess) that is recessed toward the outlet 10b, at its end portion facing the inlet 10a. As shown in FIG. 3, an outlet 11b side end portion of the sensor substrate 12 and an outlet 11b side end portion of the reinforcing plate 13 are inserted in the recess 15f. Also, the recess 15f is filled with the filler 15j. The outlet 11b side end portion of the sensor substrate 12 and the outlet 11b side end portion of the reinforcing plate 13 are fixed to the outlet-side nut 15b by the filler 15j.

As shown in FIG. 3, the inlet-side body 16 is a member in which the inlet 11a of the measurement tube 11 is inserted and the connecting flow passage 16a having a circular cross section is formed. An external thread 16b is formed on the outer circumferential surface at an end portion of the inlet-side body 16 facing the outlet 10b.

As shown in FIG. 3, the outlet-side body 17 is a member in which the outlet 11b of the measurement tube 11 is inserted and a connecting flow passage 17a having a circular cross section is formed. An external thread 17b is formed on the outer circumferential surface at an end portion of the outlet-side body 17 facing the inlet 10a.

The inlet-side body 16 and the outlet-side body 17 are each formed of a resin material (e.g., PTFE: polytetrafluoroethylene) having a high corrosion resistance.

The inlet-side ferrule 18 is a cylindrical resin member (e.g., formed of PTFE) that is inserted in between the outer circumferential surface of the measurement tube 11 and the inner circumferential surface of the outlet 10b side end portion of the inlet-side body 16.

As shown in FIG. 4, an inlet 10a side end portion of the inlet-side ferrule 18 has a tip portion 18a at which the distance between an inner circumferential surface and an outer circumferential surface of the tip portion 18a gradually decreases toward the inlet 10a. The tip portion 18a is inserted into a groove portion 16c formed inside the inlet-side body 16 as it is inserted into the inlet-side body 16.

The outlet-side ferrule 19 is a cylindrical resin member (e.g., formed of PTFE) that is inserted in between the outer circumferential surface of the measurement tube 11 and an inner circumferential surface of the inlet 10a side end portion of the outlet-side body 17.

As shown in FIG. 4, an outlet 10b side end portion of the outlet-side ferrule 19 has a tip portion 19a at which the distance between an inner circumferential surface and an outer circumferential surface gradually decreases toward the outlet 10b. The tip portion 19a is inserted into a groove portion 17c formed inside the outlet-side body 17 as it is inserted into the outlet-side body 17.

The sensor unit 10 in the flow meter 100 of the embodiment is assembled by fastening the internal threads 15g of the inlet-side nut 15a to the external threads 16b of the inlet-side body 16 with the inlet 11a of the measurement tube 11 and the inlet-side ferrule 18 inserted in the outlet 10b side end portion of the inlet-side body 16, and fastening the internal threads 15h of the outlet-side nut 15b to the external threads 17b of the outlet-side body 17 with the outlet 11b of the measurement tube 11 and the outlet-side ferrule 19 inserted in the inlet 10a side end portion of the outlet-side body 17.

The tip portion 18a of the inlet-side ferrule 18 is forced into the groove portion 16c of the inlet-side body 16 as the internal threads 15g of the inlet-side nut 15a become fastened to the external threads 16b of the inlet-side body 16.

Because the groove portion 16c is sharper than the tip portion 18a, the tip portion 18a is gradually deformed as it is forced into the groove portion 16c, and finally, deformed to be accommodated in the groove portion 16c without leaving any space.

The deformation of the tip portion 18a forms a seal area between the outer circumferential surface of the measurement tube 11 and the inner circumferential surface of the inlet-side body 16, which reliably shuts off liquid that flows out through a location of connection of the connection flow passage 16a with the internal flow passage 10c so that the liquid never leaks to the outside. Moreover, the tip portion 18a of the inlet-side ferrule 18 is positioned in the vicinity of the location of connection of the connection flow passage 16a with the internal flow passage 10c, thereby reducing an amount of liquid that flows out through the connection location to be remained (dead volume).

The inlet-side body 16 and the measurement tube 11 are connected such that they are arranged with their central axes coincident on the axis X. The connection structure enables the inlet-side body 16 and the measurement tube 11 to be joined together without any steps between their inner walls, so that the flow of the liquid flowing inside will never be turbulent. Accordingly, the sensor substrate 12 can stably measure the flow rate of the liquid.

The fastening of the internal threads 15g of the inlet-side nut 15a and the external threads 16b of the inlet-side body 16 is completed as an inlet 10a side end of the inlet-side nut 15a comes into contact with a projecting portion 16d of the inlet-side body 16. The amount of deformation of the tip portion 18a forced into the groove portion 16c can be kept appropriate by arranging the projecting portion 16d at an appropriate position.

The tip portion 19a of the outlet-side ferrule 19 is forced into the groove portion 17c of the outlet-side body 17 as the internal threads 15h of the outlet-side nut 15b become fastened to the external threads 17b of the outlet-side body 17. Because the groove portion 17c is sharper than the tip portion 19a, the tip portion 19a is gradually deformed as it is forced into the groove portion 17c, and finally, deformed to be accommodated in the groove portion 17c without leaving any space.

The deformation of the tip portion 19a forms a seal area between the outer circumferential surface of the measurement tube 11 and the inner circumferential surface of the outlet-side body 17, which reliably shuts off liquid that flows out through a location of connection of the connection flow passage 17a with the internal flow passage 10c so that the liquid never leaks to the outside. Moreover, the tip portion 19a of the outlet-side ferrule 19 is positioned in the vicinity of the location of connection of the connection flow passage 17a with the internal flow passage 10c, thereby reducing an amount of liquid that flows out through the connection location to be remained (dead volume).

The fastening of the internal threads 15h of the outlet-side nut 15b and the external threads 17b of the outlet-side body 17 is completed as an outlet 10b side end of the outlet-side nut 15b comes into contact with a projecting portion 17d of the outlet-side body 17. The amount of deformation of the tip portion 19a forced into the groove portion 17c can be kept appropriate by arranging the projecting portion 17d at an appropriate position.

A description will be given to the operation and effect of the flow meter 100 of the embodiment described above.

According to the flow meter 100 of the embodiment, the flat surface 11c formed on the outer circumferential surface of the cylindrical measurement tube 11 is bonded to the detection surface 12d of the sensor substrate 12 where the heating resistance wire 12a and the temperature detecting resistance wires 12b and 12c are formed, thereby forming the planar bonding area A having a width in the direction orthogonal to the axis X. On the outer circumferential surface of the measurement tube 11, the pair of recesses (the first recess 11e and the second recess 11f) is formed so as to sandwich the internal flow passage 10c at the position P1 where the heating resistance wire 12a is arranged on the axis X. Further, the width W1 of the bonding area A in the first portion on the axis X where the pair of recesses is arranged is narrower than the width W2 of the bonding area A in the second portion on the axis X where the pair of recesses is not arranged.

With the structure described above, in the first portion on the axis X where the pair of recesses is arranged on the axis X, the width of the bonding area A is narrowed by the pair of recesses, so that the quantity of heat transmitted from the heating resistance wire 12a to the liquid through the measurement tube 11 is increased as compared with a case where the pair of recesses is not provided. In the second portion on the axis X where the pair of recesses is not arranged, the width of the bonding area A is secured, so that the sensor substrate 12 and the measurement tube 11 can be securely bonded and fixed.

Accordingly, in the flow meter 100 having a structure in which the sensor substrate 12 having the heating resistance wire 12a and the temperature detecting resistance wires 12b and 12c formed on the detection surface 12d thereof is bonded to the cylindrical measurement tube 11, the quantity of heat transmitted from the heating resistance wire 12a to the liquid circulated in the measurement tube 11 can be increased.

In the flow meter 100 of the embodiment, the sensor substrate 12 and the measurement tube 11 are made of glass.

Using the sensor substrate 12 and the measurement tube 11 which have excellent heat resistance and less probability of deformation by heat, the flow rate measurement accuracy can be maintained regardless of changes in temperature. In addition, because the materials with the same thermal conductivity properties are bonded together, the adhesiveness of the sensor substrate 12 to the measurement tube 11 can be maintained regardless of changes in temperature.

Other Embodiments

In the above description, the measurement tube 11 is made of glass. However, the present disclosure may include another aspect. For example, the measurement tube 11 may be formed of a resin material (e.g., polycarbonate) having workability and heat resistance. The use of the resin material makes it possible to easily form the first recess 11e and the second recess 11f on the measurement tube 11.

In addition, the present invention is not limited to the embodiments described above and can be modified as appropriate without departing from the scope of the present invention.

What is claimed is:

1. A flow meter comprising:
   a cylindrical measurement tube including an inlet through which liquid enters and an outlet through which the liquid flowing from the inlet exits, and having an internal flow passage extending along an axis; and
   a temperature detecting substrate having a heating resistance element and a temperature detecting resistance element formed on a detection surface thereof along the axis, wherein an outer circumferential surface of the measurement tube is provided with a flat surface arranged as opposed to the detection surface of the temperature detecting substrate, and a pair of recesses arranged so as to sandwich the internal flow passage at a position where the heating resistance element is arranged on the axis, the flat surface and the detection surface are bonded together to form a planar bonding area having a width in a direction orthogonal to the axis, the planar bonding area includes a first bonding area corresponding to a first portion on the axis where the pair of recesses is arranged and a second bonding area corresponding to a second portion on the axis where the pair of recesses is not arranged, and the width of the first bonding area in a direction orthogonal to the axis is narrower than the width of the second bonding area in a direction orthogonal to the axis.

2. The flow meter according to claim 1, wherein an inner diameter of the internal flow passage is equal to or less than 1.5 times a width of the heating resistance element in a cross section orthogonal to the axis.

3. The flow meter according to claim 1, wherein the pair of recesses is formed of a pair of planes arranged in parallel with each other so as to sandwich the internal flow passage, and an angle formed between the flat surface and each of the pair of planes is a right angle.

4. The flow meter according to claim 1, wherein the heating resistance element is arranged at a position on a downstream side in a circulation direction of the liquid from a midpoint of a line leading from the inlet to the outlet.

5. The flow meter according to claim 4, wherein the heating resistance element is arranged at a position of a midpoint of a line leading from an end portion of the first portion facing the inlet to an end portion of the first portion facing the outlet.

6. The flow meter according to claim 1, wherein the temperature detecting substrate and the measurement tube are made of glass.

* * * * *